(12) United States Patent
Arioka et al.

(10) Patent No.: US 6,433,998 B2
(45) Date of Patent: Aug. 13, 2002

(54) SWITCHGEAR (75) Inventors: Masahiro Arioka, Tokyo; Masashi Negawa, Kagawa, both of (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/768,514

(22) Filed: Jan. 25, 2001

(51) Int. Cl.⁷ .............................................. H02B 11/00

(52) U.S. Cl. ...................... 361/606; 200/50.27; 361/640

(58) Field of Search ........................ 200/50.21–50.24, 200/50.27, 48 A, 40 R; 361/605–612, 640

(56) References Cited

U.S. PATENT DOCUMENTS

| | | |
|---|---|---|
| 4,644,442 A | 2/1987 | Ponsioen et al. |
| 6,025,983 A * | 2/2000 | Uchida et al. ............. 361/606 |

FOREIGN PATENT DOCUMENTS

| | | |
|---|---|---|
| FR | 1.124.089 | 10/1956 |
| GB | 1133051 | 11/1968 |
| JP | 62-44607 | 3/1987 |

OTHER PUBLICATIONS

European Patent Office Search Report dated Jul. 17, 2001.

* cited by examiner

*Primary Examiner*—Gregory Thompson
(74) *Attorney, Agent, or Firm*—Sughrue Mion, PLLC (57) ABSTRACT

A switchgear comprising a cable compartment, a bus conductor compartment for housing bus conductors arranged at the upper portion of a cable compartment with their back faces in alignment and an interrupter compartment disposed at the boundary portion between the bus conductor compartment and the cable compartment to intrude from the front. An upper insulating partition wall is disposed in the upper half portion of the interrupter compartment for defining a partition between the bus conductor compartment and having a penetration hole through which the terminal of the interrupter can pass, and a lower insulating partition wall is disposed in the lower half portion of the interrupter compartment for defining a partition between the cable compartment and having a window through which the terminal of the interrupter can pass. A first stationary terminal and a second stationary terminal for contacting with or separating from the switch are arranged on the bus conductor compartment side and the cable compartment side of the upper insulating partition wall and the lower insulating partition wall. A disconnector is disposed so that it movable contact is capable of contacting with or separating from the first stationary terminal and the second stationary terminal.

7 Claims, 9 Drawing Sheets

SWITCHGEAR

BACKGROUND OF THE INVENTION

This invention relates to a structure of a power switchgear containing therein a switch and a disconnector.

Figure 11:
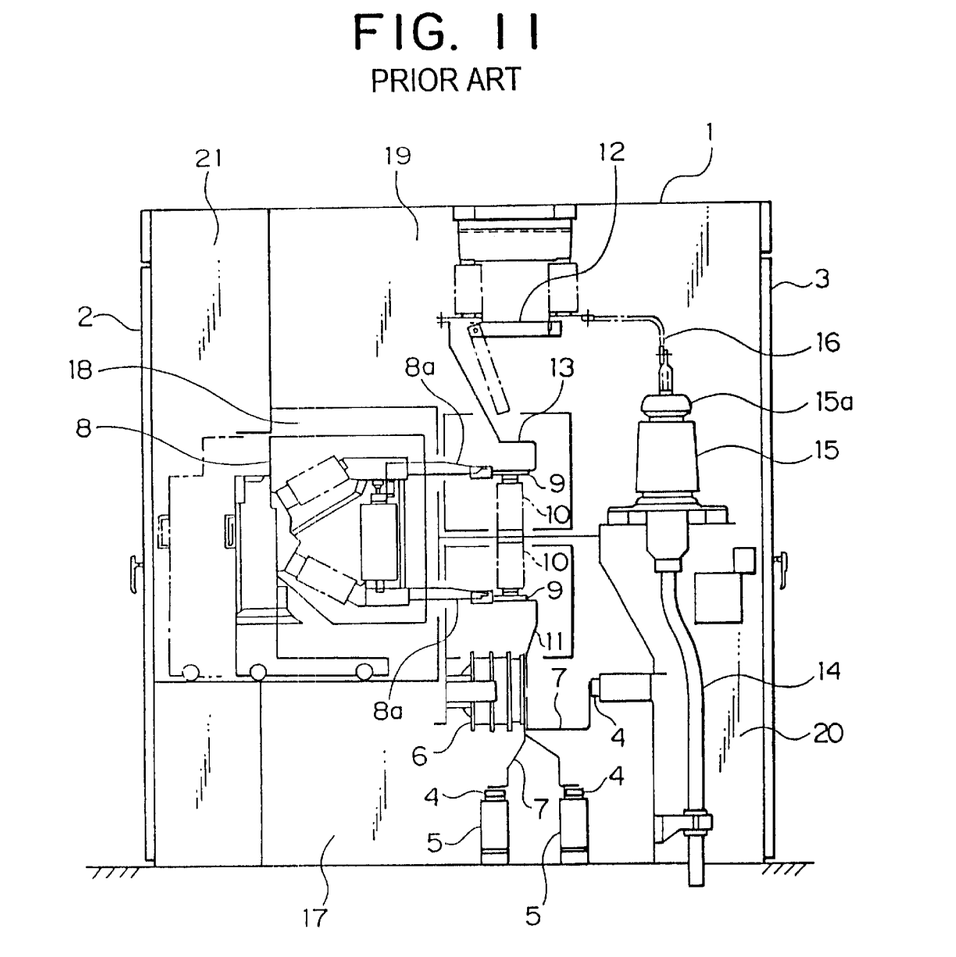
FIG. 11 is a sectional side view showing a conventional switchgear.

FIG. 11 is a sectional side view showing the structure of a conventional switchgear. In the figure, 1 is a case body of the switchgear, 2 is a front door, 3 is a rear door, 4 are bus conductors, 5 are insulators for supporting bus conductors 4, 6 is a CT (current transformer), 7 is a connection conductor for connecting between the bus conductors 4 and the CT 6 and 8 is an interrupter in the connected state, which moves to the position shown by dashed lines on the left in the figure when drawn out. 8a are terminals for the interrupter 8, 9 is a stationary terminal supported by the insulator 10, 11 is a connection conductor connecting between the CT 6 and the stationary terminal 9, 12 is a disconnector, 13 is a connection conductor connecting the stationary terminal 9 and the disconnector 12, 14 is a cable for connecting to a load, 15 is a cable head which becomes a connection portion to the cable 14, 15a is a field moderation metal disposed at the top portion of the cable head 15 and 16 is a connection conductor for connection the disconnector 12 and the cable head 15. Also, this switchgear is partitioned into a bus bar compartment 17 for housing the bus conductors 4, an interrupter compartment 18 for housing the interrupter 8, a disconnector compartment 19 for housing the disconnector 12, a cable compartment for housing the cable 14 and a controller compartment positioned behind the front door.

The conventional switchgear which has the above-described structure has its main circuit current path of substantially U-shape and the total length is long, so that a predetermined insulating space must be maintained around the main circuit, and since the main circuit is long and contains many connection portions, a large heat generates during the operation, so that a large case body was needed. Therefore, the shipping efficiency to the install site is low and the electric chamber in which the switchgear is to be installed must be large.

SUMMARY OF THE INVENTION

Accordingly, the present invention has been made in order to solve the above problems of the conventional switchgear and has as its object the provision of a disconnector unit that is compact and short in the main circuit length and small in heat generation.

With the above objects in view, the present invention resides in a switchgear comprising: a first stationary terminal and a second stationary terminal disposed in pair on a main circuit extending from a bus conductor to a cable to separate the main circuit; a switch disposed between said first stationary terminal and said second stationary terminal for switching on and off said main circuit; and a disconnector capable of contacting with or separating from said first stationary terminal or said second stationary terminal for switching on and off said main circuit.

The present invention also resides in a switchgear comprising: a first stationary terminal and a second stationary terminal disposed in pair on a main circuit extending from a bus conductor to a cable to separate the main circuit; a draw out type switch capable of contacting with or separating from one of said first stationary terminal and said second stationary terminal between said first stationary terminal and said second stationary terminal for switching on and off said main circuit; and a disconnector capable of causing its movable contact to contact with or separate from the other of said first stationary terminal and said second stationary terminal for switching on and off said main circuit.

The first stationary terminal and said second stationary terminal may be disconnecting portion terminals which contact with and separate from the main circuit terminal of the draw out type switch.

The switchgear of the present invention may comprise: a cable compartment; a bus conductor compartment for housing bus conductors arranged at the upper portion of a cable compartment with their back faces in alignment; an interrupter compartment disposed at the boundary portion between said bus conductor compartment and said cable compartment to intrude from the front; an upper insulating partition wall disposed in the upper half portion of said interrupter compartment for defining a partition between said bus conductor compartment and having a penetration hole through which the terminal of said interrupter can be pass; a lower insulating partition wall disposed in the lower half portion of said interrupter compartment for defining a partition between said cable compartment and having a window through which the terminal of said interrupter can be pass; a first stationary terminal and a second stationary terminal for contacting with or separating from the switch arranged on the bus conductor compartment side and the cable compartment side of said upper insulating partition wall and said lower insulating partition wall; and a disconnector of which movable contact is capable of contacting with and separating from said first stationary terminal and said second stationary terminal.

A cable head may be disposed at the tip of the cable raised from the below, the movable contact of the disconnector may be mounted to the top portion of the cable head and said movable contact may be capable of contacting with or separating from the first stationary terminal and the second stationary terminal.

The electrical insulating plate may be disposed at the side portion of the contacting portion between said first stationary terminal and the second stationary terminal and the movable contact of the disconnector to provide a partition with respective to the neighboring phases and the ground.

A cable head may be disposed at the tip of the cable raised from the below, the movable contact of the disconnector may be mounted to the top portion of the cable head and said movable contact of said disconnector may be operable into three positions of a connected position in which it is connected to the first stationary terminal or the second stationary terminal, a disconnected position in which it is separated by a predetermined distance from the first stationary terminal or the second stationary terminal and a grounded position in which it is connected to the grounding terminal.

BRIEF DESCRIPTION OF THE DRAWINGS

The present invention will become more readily apparent from the following detailed description of the preferred embodiment taken in conjunction with the accompanying drawings, in which.

DESCRIPTION OF THE PREFERRED EMBODIMENTS

Figure 1:
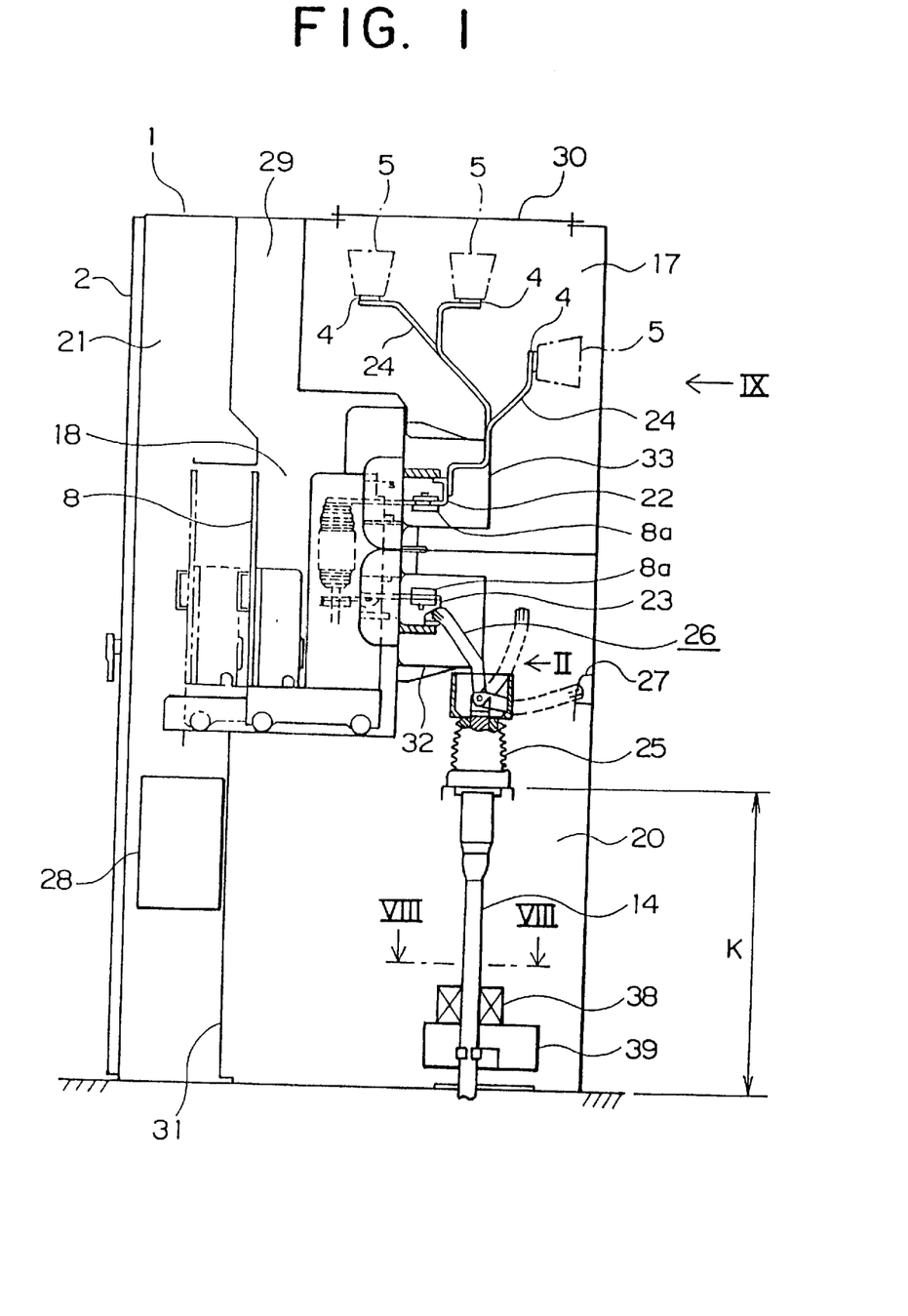
FIG. 1 is a cross sectional view of a switchgear of the first embodiment of the present invention.

FIG. 1 is a sectional side view of a switchgear of the first embodiment of the present invention, in which 1 is a case body of the switchgear, 2 is a front door, 4 are bus conductors extending in perpendicular to the plane of FIG. 1, 5 are insulators for supporting bus conductors 4 and are supported by support members (not shown). 8 are interrupters of the draw out type illustrated in the connected state in FIG. 1. The interrupters 8 can be drawn out to the position shown by dashed lines on the left portion of the figure during the main circuit inspection. 8a are terminals for the interrupters 8 for separably connecting to a bus conductor side stationary terminal 22 (a first stationary terminal) and a disconnector side stationary terminal 23 (a second stationary terminal). 24 is a connection conductor connecting the bus conductor 4 and the stationary terminal 22, 14 is a cable, 25 is a cable head which is a connection portion to the cable 14. 26 is a disconnector having a pivot point on the cable head 25 and capable of contacting with and separating from the stationary terminal 23 or the ground terminal 27. Also, 28 is an operating mechanism for the disconnector 26 disposed in the one side of the case body as viewed from the front door 2 side and connected to the disconnector 26 through the operating link mechanism (not shown). This switchgear is partitioned into a bus conductor compartment 17 for housing the bus conductors 4, an interrupter compartment 18 for housing the interrupter 8, a cable compartment 20 for housing the cable 14, a controller compartment 21 for housing controllers (not shown) and a heat dissipating duct 29 for releasing heat and pressure from the interrupter compartment 18.

The maintenance and the inspection of the switchgear of this embodiment are carried our as for the bus conductor compartment 17 from the above of the case body 1 with an inspection cover 30 removed from the upper portion. Also, as for the interrupter compartment 18, the inspection and maintenance are carried out with the front door 2 opened and the interrupter 8 drawn out to the drawn out position shown by the dashed lines or with the switchgear taken out outside. The cable compartment 20 can inspected from the front door 2 side with the inspection cover 31 removed.

Figure 2:
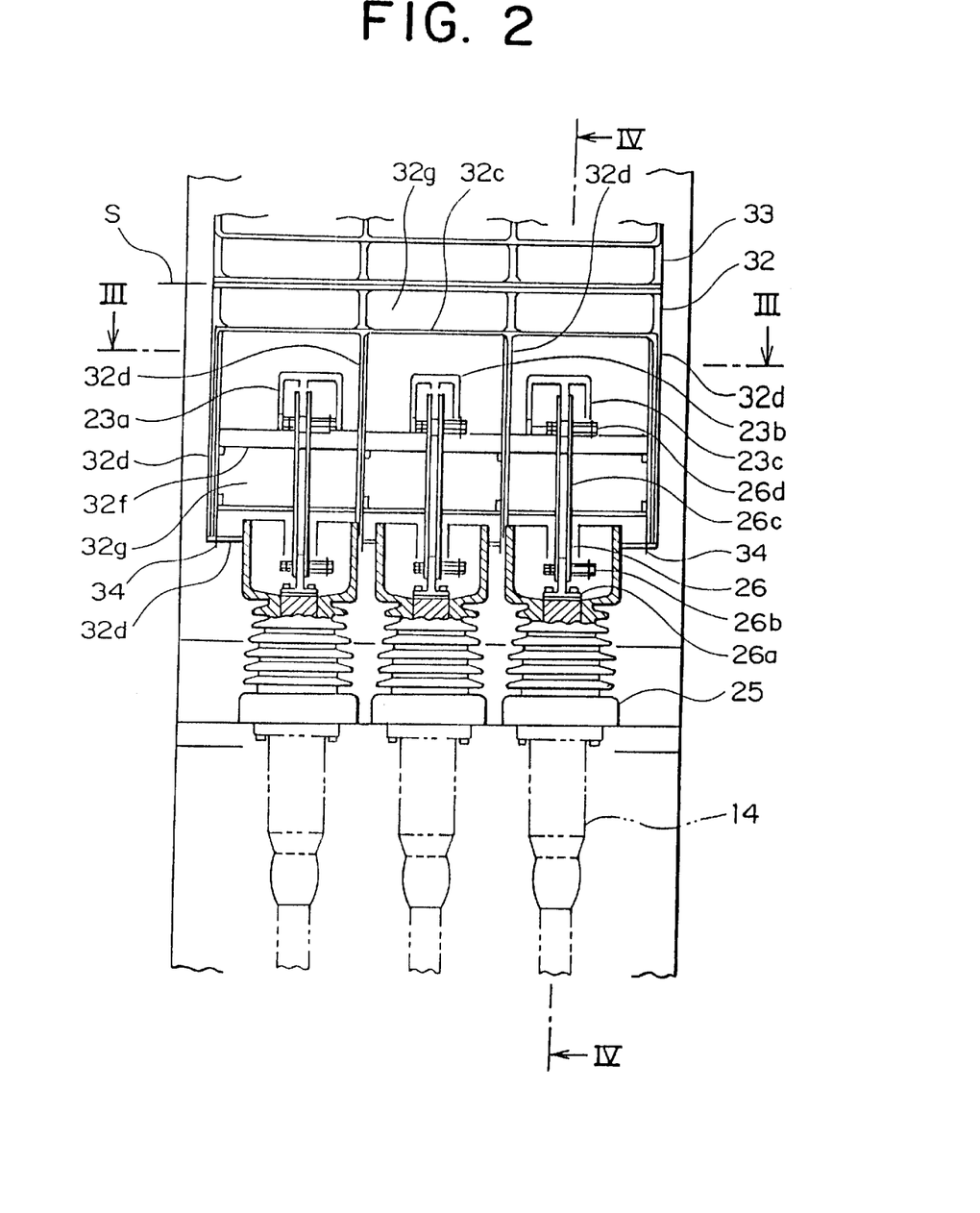
FIG. 2 is a partial sectional rear view as viewed in the direction of arrow II of FIG. 1.
Figure 3:
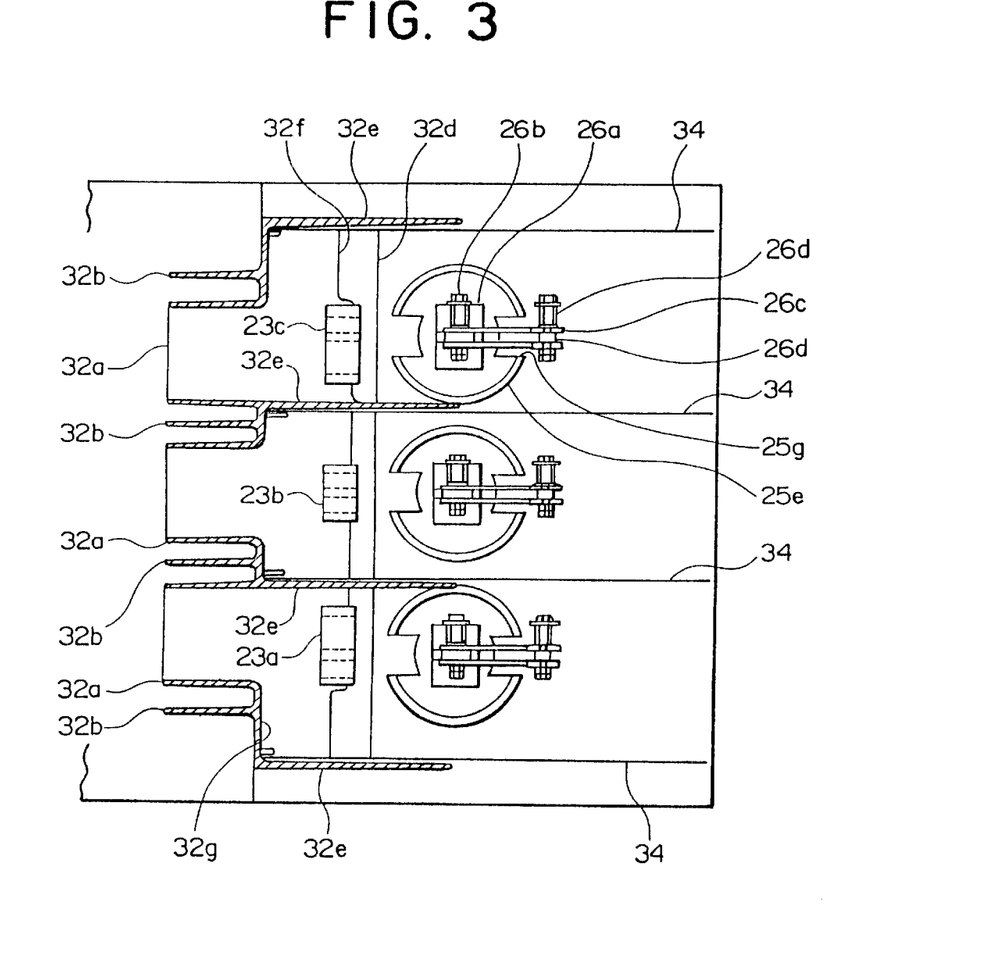
FIG. 3 is a partial sectional plan view as viewed in the direction of arrow III of FIG. 2.
Figure 4:
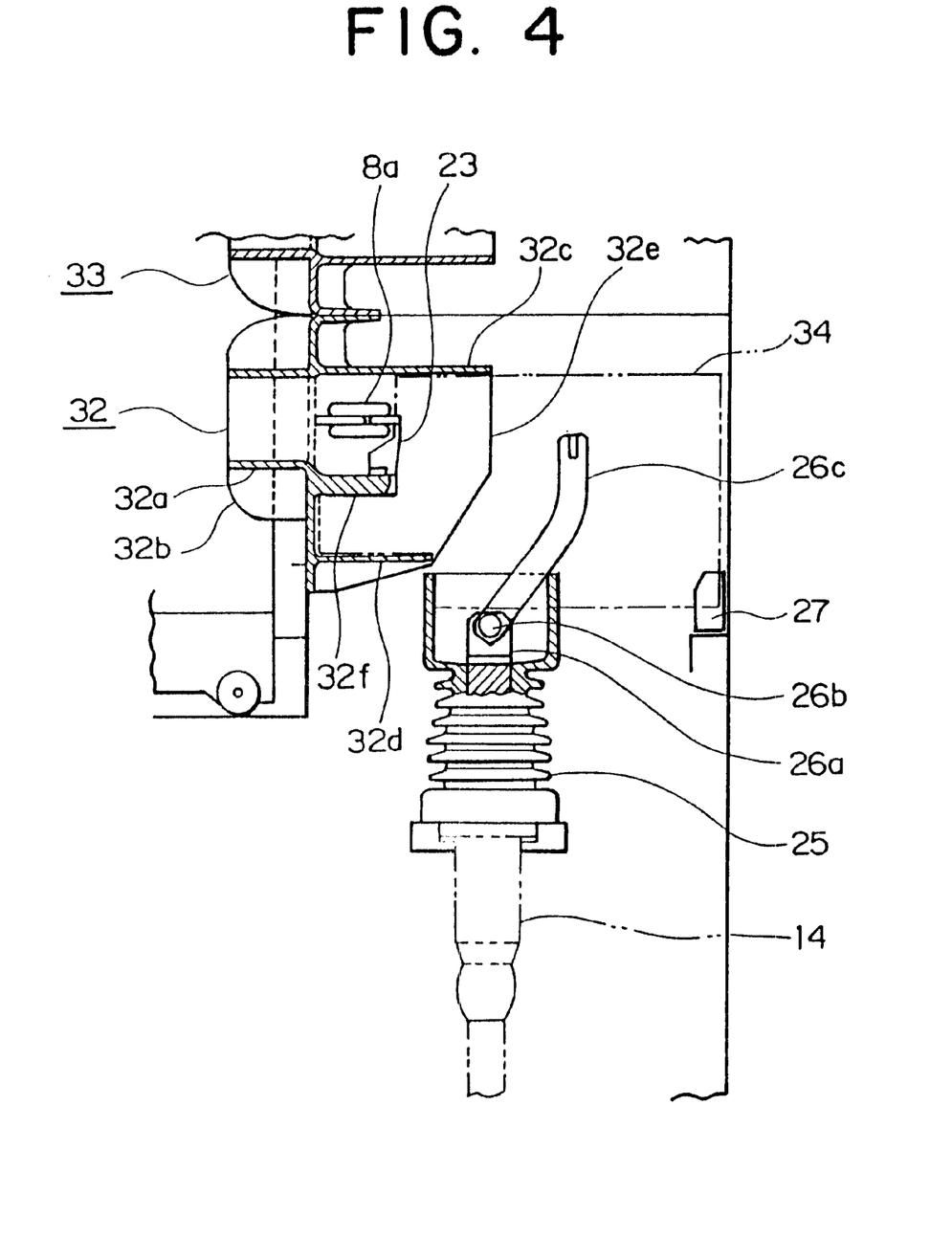
FIG. 4 is a partial sectional rear view as viewed in the direction of arrow IV of FIG. 2.

FIG. 2 is a partial sectional rear view as viewed from the left of FIG. 1 (in the direction of the arrow II), FIG. 3 is a partial sectional plan view as viewed in the direction of the arrow III of FIG. 2 and FIG. 4 is a partial sectional side view as viewed in the direction of arrow IV of FIG. 2. In the figure, 32 is a lower insulating partition wall partitioning between the interrupter compartment 18 and the cable compartment 20, 33 is an upper insulating partition wall partitioning between the interrupter compartment 18 and the bus conductor compartment 17, the insulating partition walls 32 and 33 are disposed in an abutting state at the position S of FIG. 2.

The lower insulating partition wall 32 comprises a partition wall 32g partitioning between the interrupter compartment 18 and the cable compartment 20, annular insulating walls 32a in the form of cylinders extending at the corresponding positions of each of the three phases toward the interrupter compartment 18 from the partition wall 32g and each defining therein a through hole communicating the interrupter compartment 18 and the cable compartment 20, plate-like insulating walls 32b disposed between the annular insulating walls 32a or between the annular insulating wall 32a and the ground, upper insulating walls 32c defining a prism-like insulating wall projecting from the partition wall 32g toward the cable compartment 20 to surround each of three phases, vertical insulating walls 32e partitioning between the lower insulating wall 32d and each phase and the ground, and an insulating support portion 32f transversely extending at the central portion of the prism-like insulating walls. The upper insulating partition wall 33 is symmetric to the lower insulating wall 32 about the symmetry line of the abutting portion S shown in FIG. 2. The distance to the tip of the lower insulating wall 32d from the insulating wall 32g is slightly shorter than the upper insulating wall 32c, resulting in an easy conductor connection from the movable contact of the disconnector 26 or from the bus conductors 4.

The disconnector 26 will now be described as to it structure. In FIG. 2, the electrically conductive support portion 26a mounted to the top portion of the cable head 25 has a pivot shaft 26b, which pivotally support a movable contact arm 26c mounted on the both sides of the support portion 26a. The pivot shaft 26b has a spring on one end so that the movable contact arm 26c is always urged to bring the movable contact arm 26c into contact under a predetermined pressure with the support portion 26a. 26d is a pressure contact portion which has substantially the same structure as the pivot shaft 26b (a spacer 26e is inserted instead of the support portion 26a) and disposed in the vicinity of the tip of the movable contact arm 26c, so that the movable contact arm 26c are urged to be brought into pressure contact under a predetermined contact pressure with the stationary terminal 23 of the disconnector or the ground terminal 27. It is to be noted that the pressure contact portion 26d is not illustrated in FIG. 4.

The detailed explanation of the operation of the disconnector 26 and the structure of the cable head 25 will now be made in conjunction with FIGS. 5 and 6. 23c are stationary terminals of the disconnectors 26 each securely mounted to the insulating support portion 32f of the lower insulating partition wall 32. The stationary terminal 23c has connected at the upper contact portion the terminals 8a of the interrupters 8 and has connected at the central vertical portion the movable contact 26c of the disconnector 26. That is, through the small stationary terminals 23c, the interrupters 8 and the disconnectors 26 are brought into contact with and separated from each other. The movable contact arm 26c of the disconnector 26 is driven by a drive mechanism (not shown) into three positions of a connected position G (main circuit connected), a disconnected position H (main circuit opened) and a grounded position I (cable grounded). In the grounded position I, a grounding electrode 27 supported by the support 1a is connected to the movable contact 26c, whereby the cable 14 is grounded. The disconnectors 26 are disposed in parallel for the three phases as shown in FIG. 3.

Thus, the stationary terminal 23 which is a small piece connects the terminal 8a of the interrupter (the stationary terminal on the switchgear side which contacts and separate from the terminal 8a of the interrupter) and the stationary terminal 23 is used as the stationary terminal directly contacting with the movable contact arm 26c of the disconnector 26 and the pivot shaft 26b of the disconnector 26 is disposed at the top portion of the cable head 25, so that no connecting conductor is needed, allowing the main circuit arrangement to be very simple. Since the main circuit as a whole is arranged in a compact design, the main circuit length is shortened and since the number of the connection portions are decreased, the heat generation due to the current flow can be suppressed to be small. Also, on the side of the bust conductors 4, the connection to the terminal 8a of the interrupter can be made by the small piece stationary terminals 22 and the stationary terminal 22 is connected to the connection conductor 24, so that overall size of the main circuit can be made compact.

The cable head 25 is mounted to the support 1b supported from the case body 1 and comprises a cylindrical insulating support 25a having around its outer circumference sheds for obtaining a large surface flash over insulating distance to ground and having at its central portion a bore 25b downwardly open for allowing the cable 14 to be inserted therein, a core conductor 25d electrically connected to the support portion 26a and having at it lower portion a bore 25c continuous to the bore 25b, and an annular insulating wall 25f surrounding the outer circumference of the support portion 26a.

When the cable 14 is connected, an end of the cable 14 is inserted from the bottom portion of the cable head 25. The cable 14 has a conductor 14a covered with the insulation 14b and the end portion of the conductor 14a is projected from the tapered portion 14c of the insulation like a pencil. The tip of the conductor 14a of the cable 14 is inserted into the bore 25b formed in the bottom of the core conductor 25d to bring it into a contact with the annular insulating wall 25f disposed within the bore 25c. When the cable 14 is inserted into the cable head 25, the tapered portion 14c of the cable 14 is brought into contact with the tapered portion of the bore 25b of the cable head 25 and held at the predetermined connected position, and the projection portion 14d projected from the outer circumference portion of the cable 14 is held by an annular holding ring 35 which is secured by bolts 36 thereby firmly held at position.

Figure 5:
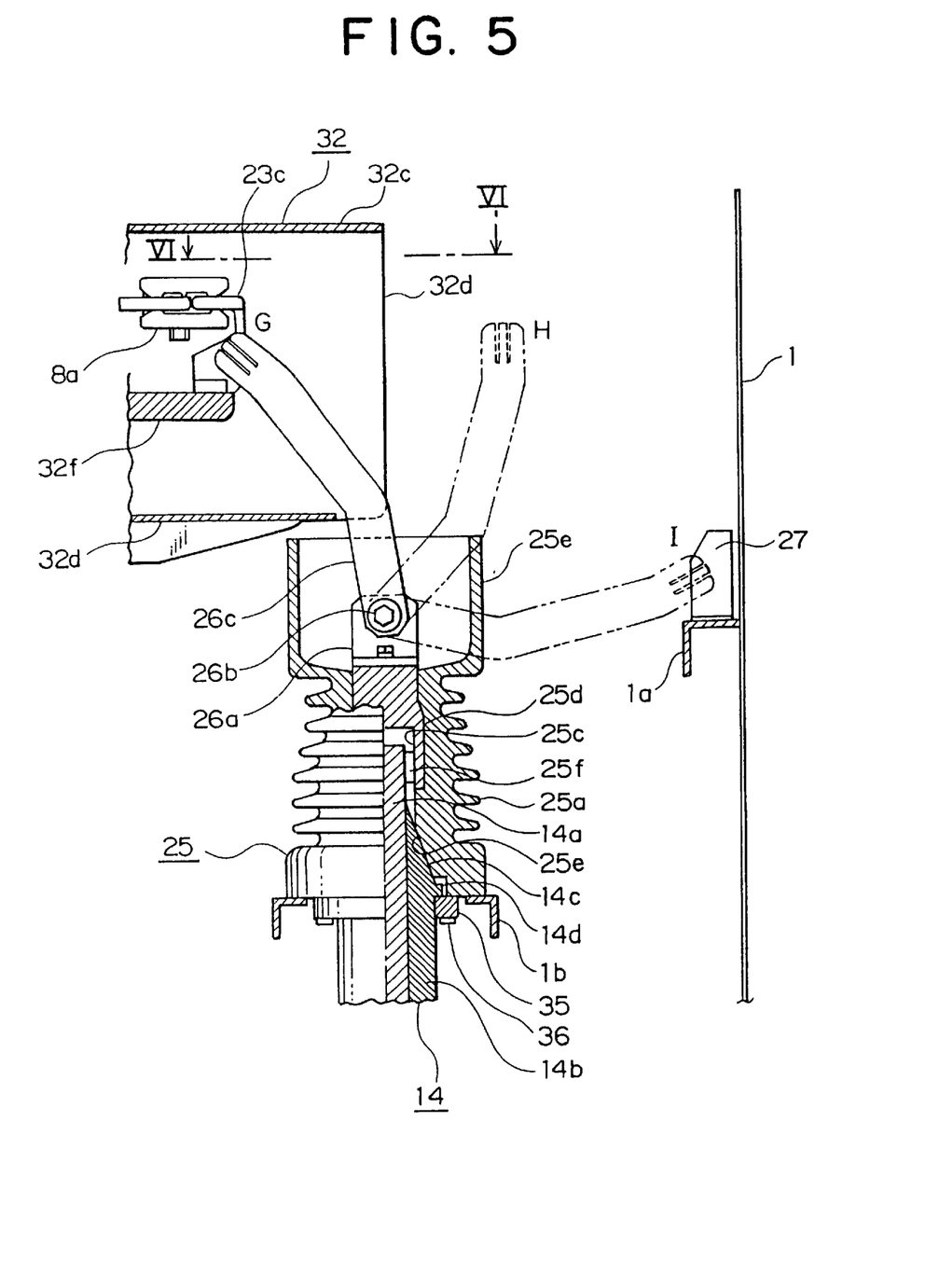
FIG. 5 is a partial sectional side view illustrating the details of the cable head and the disconnector of FIG. 4.
Figure 6:
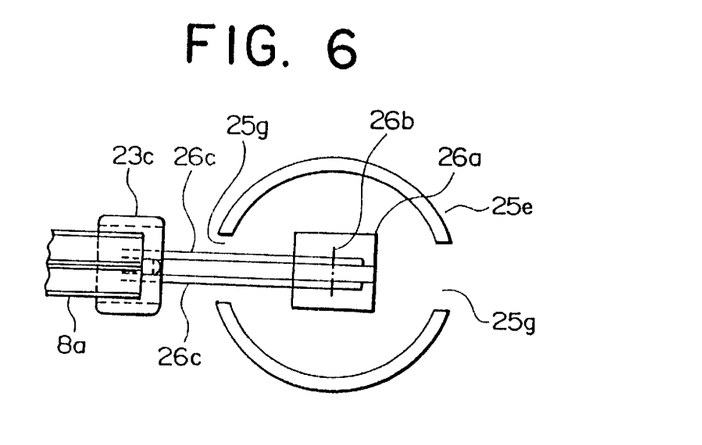
FIG. 6 is a partial plan view as viewed in the direction of arrow VI of FIG. 5.

FIG. 6 is a partial plan view as viewed from the direction VI of FIG. 5 and illustrates its main portion of the switchgear. 25g is a notch provided in the annular insulating wall 25e from which a portion of the wall that otherwise will interfere with the movable contact arm 26c of the disconnector 26.

Since the annular insulating wall 25e is thus disposed around the mounting portion of the disconnector 26 at the top portion of the cable head 25, the projection portion of the support portion 26a of the disconnector 26 is covered by it, so that the inter-phase and ground insulating distance can be short. Therefore, small width and depth dimensions of the switchgear can be attained.

Figure 7:
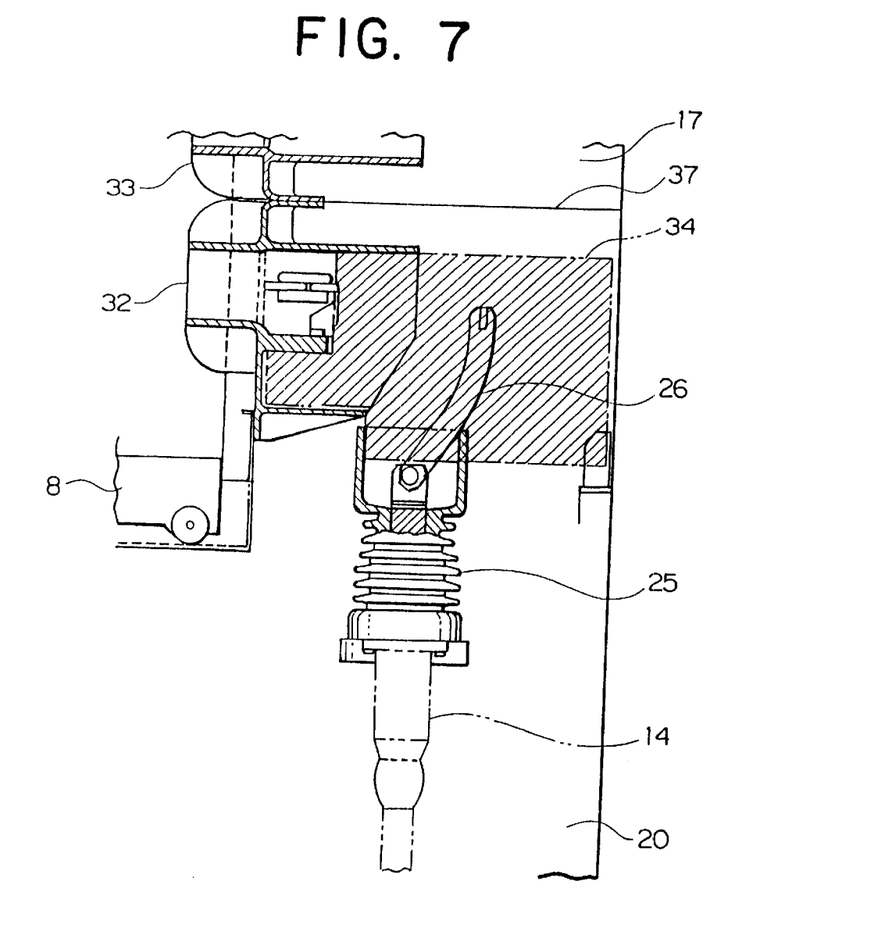
FIG. 7 is a partial sectional side view illustrating the arrangement of the barrier of FIG. 4.

FIG. 7 is a partial sectional side view illustrating the arrangement of the barrier of FIG. 4, the barrier 34 being shown by a hatched area. With the barrier 34 thus arranged, even when the movable contact arm 26c of the disconnector 26 is moved between the connected position, the disconnected position and the grounded position, the space insulating distance between the phases and to the ground in the sideward direction, so that the width dimension of the switchgear can be made small. 37 is a grounded metal partition wall partitioning between the bus conductor compartment 17 and the cable compartment 20. The plan view of the arrangement of the barrier 34 is shown in FIG. 3.

Figure 8:
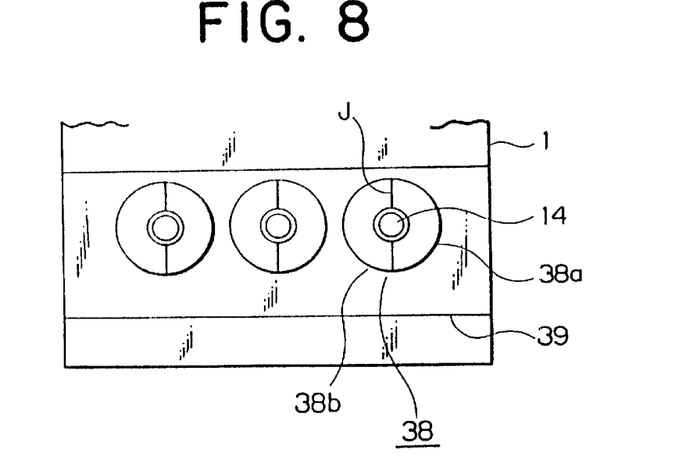
FIG. 8 is a partial plan view as viewed in the direction of arrow VIII of FIG. 1.

FIG. 8 is a partial plan view as viewed in the direction of arrow VIII of FIG. 1. 38 is a current transformer, which has combined two half-current transformers 38a and 38b disposed to surround the outer circumference of the cable 14. Also, it is disposed around the risen portion of the cable 14 as shown in FIG. 1.

Thus, when the cable 14 is to be raised, the height of the raised portion of the cable 14 needs to be not less than about 80 cm from the floor surface of the switchgear, so that this portion has been a space of a low occupation factor as seen from the conventional design shown in FIG. 11. Contrary to this, by positioning the penetration type current transformer 38 on the raised portion of the cable 14, this space can be efficiently utilized and the need for preparing a space for the installation of the current transformer 38 somewhere else is eliminated. Further, since the conventional connecting conductors 7 and 11 are not necessary, the insulating spaces around these conductors are not necessary, so that the length of the main circuit can be short and the heat generation loss can be small.

Further, 39 is a support for the current transformer, on which combined two halves 38a and 38b of the current transformer are placed and combined on the support 39 into a ring and secured to the support 39. Since the current transformer 38 is divided-type having transformer halves 38a and 38b, the assembly can be carried out within a narrow space and the disassembly of the device can be easily achieved at the time of failure.

Figure 9:
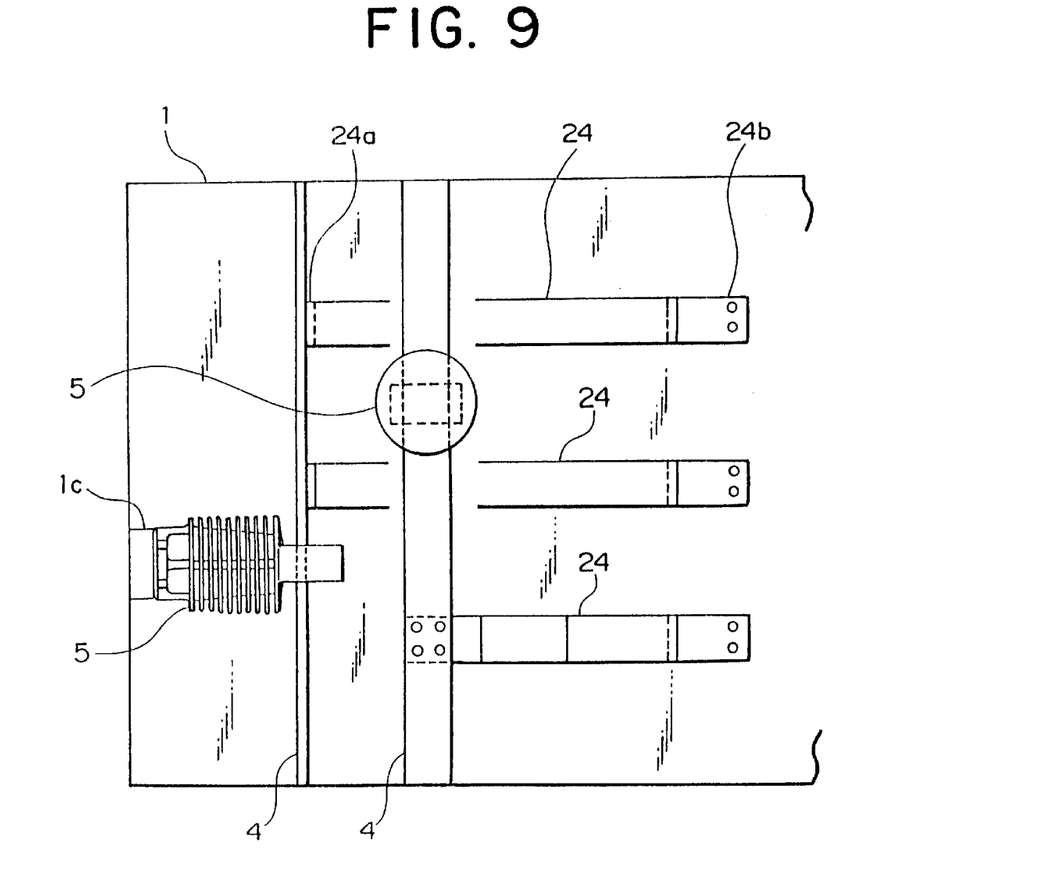
FIG. 9 is a partial plan view as viewed in the direction of arrow IX of FIG. 1.
Figure 10:
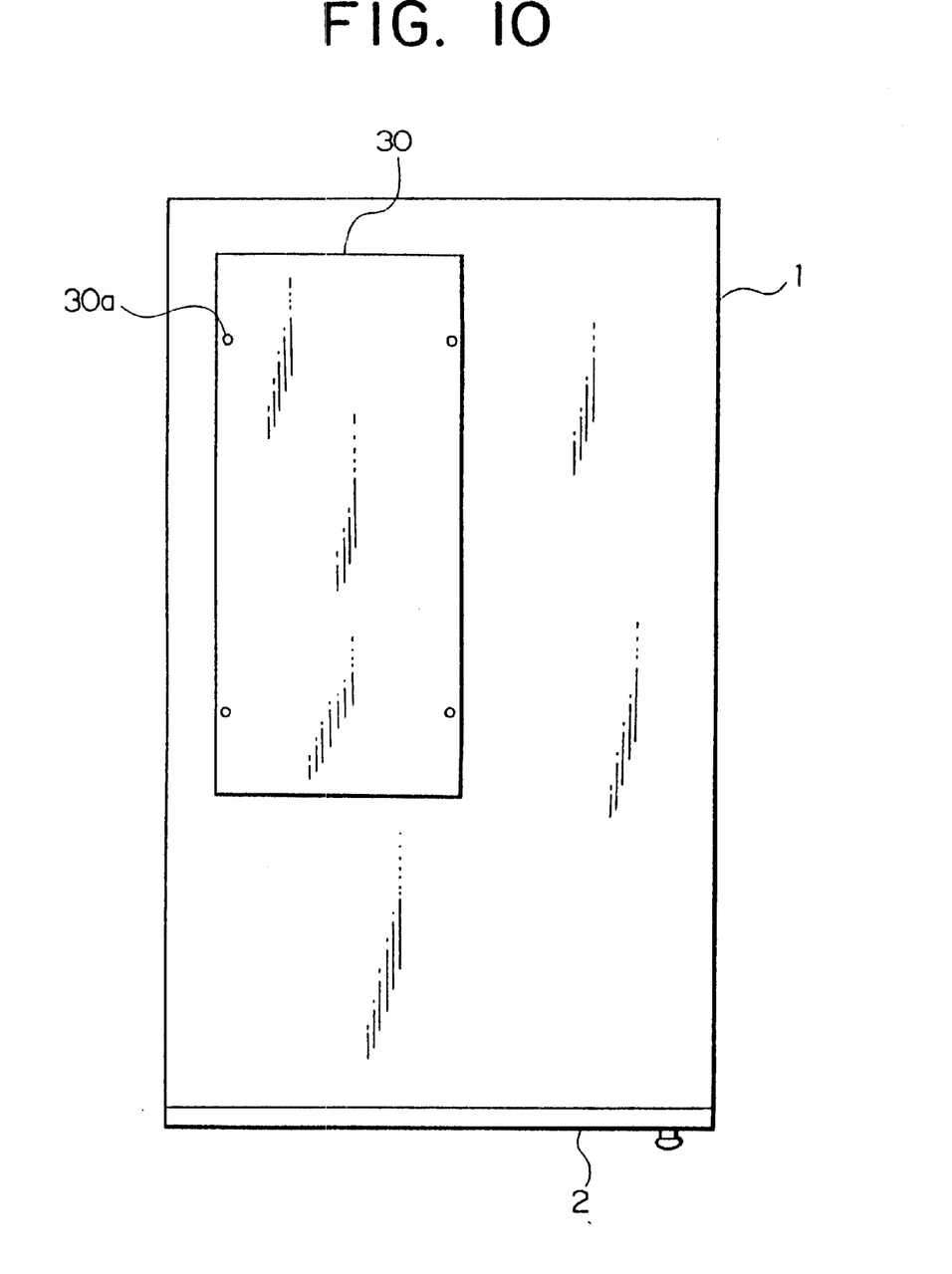
FIG. 10 is a plan view of FIG. 1.

FIG. 9 is a partial plan view as viewed in the direction of arrow IX of FIG. 1, as viewed behind the bus conductor compartment 17, in the figure, the left portion being top and the right portion being bottom. In the figure, 1c is a support held by the case body 1 and 5 is an insulator supported by the support 1c. Two bus conductors 4 for two phases out of three bus conductors 4 for the three phases disposed side-by-side and in parallel are arranged so that the width direction surfaces are upwardly directed and the remaining one bus conductor 4 is arranged with the thickness direction surfaces directed upward. The connecting conductors 24 are secured with the connection portion 24b on one side connected to the stationary terminal 22. Also, each bus conductors 4 are supported by a single insulator 5 and the connecting portion 24a of the connecting portion 24. The length of each bus conductor 4 is slightly shorter than the width of the switchgear, and the connection to the bus conductors 4 of the neighboring switchgear is made by means of connecting piece (not shown) disposed across the bus conductors. These connection and inspection operations on the bus conductors 4 are carried out from the above the switchgear with the inspection cover 30, which is shown in the plan view (FIG. 10) which is a view of FIG. 1 as viewed from the above, removed.

As has been described, since two point fastening can be realized by supporting the bus conductors 4 by a single insulator 5 and a single connecting conductor 24, the number of the parts needed for supporting the bus conductors can be reduced. Also, three bus conductors 4 are arranged so that two bus conductors 4 are disposed with the width direction surfaces upwardly directed and in the front portion of the upper space of the switchgear and that the other one is disposed with the thickness direction surfaces directed upward in the deepest portion of the upper space. Therefore, the depth dimension of the switchgear can be small as compared to the case where three bus conductors 4 are disposed with their width direction surfaces upwardly directed and the assembly and inspection from the above of the switchgear can be easily achieved.

With the above arrangement, the inspection and maintenance can be carried out from the above of the switchgear as for the bus conductor chamber 17 and the from the front of the switchgear as for the cable compartment 20. Therefore, a space behind the switchgear is not necessary, enabling the space necessary for installation of the switchgear to be small.

While the description has been made in terms of a draw out type interrupter as an example of a switch, the switch is not limited to the draw out type switch but may be of the stationary type as long as it is connected to the first stationary terminal 22 and the second stationary terminal 23. Also, the switch has been explained as being an interrupter, it may be a contactor or a load switch.

As has been described, the switchgear of the present invention comprises a first stationary terminal and a second stationary terminal disposed in pair on a main circuit extending from a bus conductor to a cable to separate the main circuit, a switch disposed between the first stationary terminal and the second stationary terminal for switching on and off the main circuit; and a disconnector capable of contacting with or separating from the first stationary terminal or the second stationary terminal for switching on and off the main circuit. Therefore, a compact switchgear that is small in the number of parts and short in the main circuit length can be obtained.

The present invention also resides in a switchgear comprising a first stationary terminal and a second stationary terminal disposed in pair on a main circuit extending from a bus conductor to a cable to separate the main circuit, a draw out type switch capable of contacting with or separating from one of the first stationary terminal and the second stationary terminal between the first stationary terminal and the second stationary terminal for switching on and off the main circuit, and a disconnector capable of causing its movable contact to contact with or separate from the other of the first stationary terminal and the second stationary terminal for switching on and off the main circuit. Therefore, a compact switchgear that is small in the number of parts and short in the main circuit length can be obtained.

The first stationary terminal and the second stationary terminal may be disconnecting portion terminals which contact with and separate from the main circuit terminal of the draw out type switch. Therefore, a switchgear that is small in the number of connection portions and in heat generation can be obtained.

The switchgear of the present invention may comprise a cable compartment, a bus conductor compartment for housing bus conductors arranged at the upper portion of a cable compartment with their back faces in alignment, an interrupter compartment disposed at the boundary portion between the bus conductor compartment and the cable compartment to intrude from the front, an upper insulating partition wall disposed in the upper half portion of the interrupter compartment for defining a partition between the bus conductor compartment and having a penetration hole through which the terminal of the interrupter can be pass, a lower insulating partition wall disposed in the lower half portion of the interrupter compartment for defining a partition between the cable compartment and having a window through which the terminal of the interrupter can be pass, a first stationary terminal and a second stationary terminal for contacting with or separating from the switch arranged on the bus conductor compartment side and the cable compartment side of the upper insulating partition wall and the lower insulating partition wall, and a disconnector of which movable contact is capable of contacting with and separating from the first stationary terminal and the second stationary terminal. Therefore, a compact switchgear that is short in the main circuit length and small in heat generation can be obtained.

A cable head may be disposed at the tip of the cable raised from the below, the movable contact of the disconnector may be mounted to the top portion of the cable head and the movable contact may be capable of contacting with or separating from the first stationary terminal and the second stationary terminal. Therefore, a compact switchgear that is short in the main circuit length and small in heat generation can be obtained.

The electrical insulating plate may be disposed at the side portion of the contacting portion between the first stationary terminal and the second stationary terminal and the movable contact of the disconnector to provide a partition with respective to the neighboring phases and the ground. Therefore, a compact switchgear that is narrow in the width can be obtained.

A cable head may be disposed at the tip of the cable raised from the below, the movable contact of the disconnector may be mounted to the top portion of the cable head and the movable contact of the disconnector may be operable into three positions of a connected position in which it is connected to the first stationary terminal or the second stationary terminal, a disconnected position in which it is separated by a predetermined distance from the first stationary terminal or the second stationary terminal and a grounded position in which it is connected to the grounding terminal. Therefore, a compact switchgear that is small in the number of parts, short in the main circuit length and small in heat generation can be obtained.

What is claimed is:

1. A switchgear, comprising:
    a cable having a cable head at a top portion thereof;
    a main circuit extending from said cable to a bus conductor;
    a first stationary terminal and a second stationary terminal disposed in series on said main circuit between said bus conductor and said cable, said first stationary terminal being mounted within a space surrounded by an upper insulating partition wall and said stationary terminal being mounted within a space surrounded by a lower insulating partition wall;
    a switch disposed between said first stationary terminal and said second stationary terminal for switching on and off said main circuit; and
    a disconnector pivotally mounted on the cable head of said so as to be capable of contacting with or separating from said first stationary terminal or said second stationary terminal for switching on and off said main circuit.

2. A switchgear, comprising:
    a cable having a cable head at a top portion thereof;
    a main circuit extending from said cable to a bus conductor;
    a first stationary terminal and a second stationary terminal disposed in series on said main circuit between said bus conductor and said cable, said first stationary terminal being mounted within a space surrounded by an upper insulating partition wall and said stationary terminal being mounted within a space surrounded by a lower insulating partition wall;
    a draw out switch capable of contacting with or separating from one of said first stationary terminal and said second stationary terminal between said first stationary terminal and said second stationary terminal for switching on and off said main circuit; and a disconnector capable of causing its movable contact to contact with or separate from one of said first stationary terminal and said second stationary terminal for switching on and off said main circuit.

3. A switchgear as claimed in claim 2, wherein said first stationary terminal and said second stationary terminal are disconnecting portion terminals which contact with and separate from the main circuit of the draw out switch.

4. A switchgear, comprising:

a cable compartment housing a cable;

a main circuit extending from said cable to bus conductors;

a bus conductor compartment housing the bus conductors and arranged above said cable compartment, a back face of said bus conductor compartment being flush with a back face of said cable compartment;

an interrupter compartment arranged to be formed by caving in a front boundary portion between said bus conductor compartment and said cable compartment;

an upper insulating partition wall extending from an upper half portion of said interrupter compartment to said bus conductor compartment and having a penetration hole through which a terminal of an interrupter can pass;

a lower insulating partition wall extending from a lower half portion of said interrupter compartment to said cable compartment and having a window through which the terminal of said interrupter can pass;

a first stationary terminal and a second stationary terminal disposed in series on said main circuit for contacting with or separating from a switch, said first stationary terminal being surrounded by said upper insulating partition wall of the bus conductor compartment and said second stationary terminal being surrounded by said lower insulating partition wall of the cable compartment; and a disconnector having a movable contact that is movable from a first position in which said first stationary terminal and said second stationary terminal are conductively connected to said main circuit, to a second position in which the conductive connection is broken.

5. A switchgear as claimed in claim 4, wherein a cable head is disposed at a tip of the cable, and the movable contact of the disconnector is pivotally mounted to the top portion of the cable head so that said movable contact is capable of contacting with or separating from the first stationary terminal and the second stationary terminal.

6. A switchgear as claimed in claim 4, wherein an electrical insulating plate is disposed at both sides of said first stationary terminal and the second stationary terminal to provide the movable contact of the disconnector with a partition with respect to neighboring phases and a ground.

7. A switchgear as claimed in claim 4, wherein a cable head is disposed at a tip of the cable, and the movable contact of the disconnector is mounted on a top portion of the cable head so that said movable contact of said disconnector is movable between three positions:

a connected position in which it is connected to the first stationary terminal or the second stationary terminal, a disconnected position in which it is separated by a predetermined distance from the first stationary terminal or the second stationary terminal and a grounded position in which it is connected to a grounding terminal.

* * * * *